United States Patent [19]
Müller

[11] 3,912,956
[45] Oct. 14, 1975

[54] DIRECT-CURRENT MOTOR

[75] Inventor: Rolf Müller, St. Georgen, Germany

[73] Assignee: Papst-Motoren KG, St. Georgen, Germany

[22] Filed: July 22, 1974

[21] Appl. No.: 490,670

[30] Foreign Application Priority Data
July 20, 1973 Germany.............................. 2336955

[52] U.S. Cl................. 310/68 C; 310/156; 310/268
[51] Int. Cl.²......................................... H02K 11/00
[58] Field of Search........ 310/67, 68 R, 68 B, 68 D, 310/156, 268; 308/138, 254

[56] References Cited
UNITED STATES PATENTS
3,840,761  10/1974  Muller ............................. 310/268 X
3,845,339  10/1974  Merkle et al. ....................... 310/156

FOREIGN PATENTS OR APPLICATIONS
1,563,418  5/1970  Germany

*Primary Examiner*—Donovan F. Duggan
*Attorney, Agent, or Firm*—Craig & Antonelli

[57] ABSTRACT

In a collectorless d-c motor with a firm stable stator plate arranged between two rotor disks of a permanent-magnet rotor, this stator plate is clamped between two housing shells. The housing shells rigidify the stator plate. An electronic commutator circuit is provided for the motor which is optionally integrated with other electronic circuits. The circuit elements for these electronic circuits are disposed, in part, within the housing shells on the stator plate and, in part, outside of the housing shells on the projecting rim of the stator plate. In this way, the motor and the circuit elements mounted within the housing shells are shielded magnetically and thermally by the housing shells.

12 Claims, 6 Drawing Figures

Fig. 1

DIRECT-CURRENT MOTOR

BACKGROUND AND SUMMARY OF THE INVENTION

This invention relates to a collectorless d-c motor with a stable stator plate arranged between two rotor disks of a permanentmagnet rotor; circuit elements with associated flat conductor connections and flat motor coils are attached to this stator plate, the latter being attached between the edges of two housing shells disposed so that they face each other with their open sides.

Such a d-c motor is known from DOS (German unexamined laid-open application) 1,563,418. In this conventional d-c motor, the stator plate extends only within the housing formed by the two shells and is provided with printed induction coil windings, a Hall generator to control the commutation, and printed circuit connections.

For the operation of collectorless d-c motors, electric circuit elements are required for the commutator circuit, electric circuit elements for a possibly provided temperature-compensating circuit, preferably in connection with a speed control circuit. Particularly in case of a compact construction, there is, in certain cases, insufficient room on the stator plate within the motor housing formed by the housing shells.

Accordingly, the first object of this invention is to make simple provisions so that parts of the associated electric circuit can also be attached outside of the housing.

In many cases, it is necessary to shield part of the circuit and/or of the circuit elements thermally or electrically against environment. For example, if a temperature-compensation circuit is provided, the latter must be operated in dependence on the motor temperature and must be protected from a sudden change of the temperature of the external atmosphere. It is also contemplated by this invention to shield parts of separate pick-up systems (f.i.) from the magnetic stray flux of the motor.

The stator plate is to be maximally thin on one side, so that it can be arranged within a narrow air gap. On the other hand, the plate must be sufficiently stiff so as not to be deformed by stress even under extreme operating conditions. Therefore, it is also contemplated by this invention to rigidify the stator plate.

The invention contemplates a motor with housing shells which consist of a metal with edges pointing flange-like toward the outside. These edges are attached to the stator plate in flat contact therewith by means of mounting elements distributed along the periphery of the edges and extending through these edges and the interposed stator plate at points free of conductors. The stator plate projects toward the outside beyond the edges of the housing shells and is provided with circuit elements within and outside of the housing shells. The annular zones where the edges contact the stator plate are preferably left untouched and conductor connections of a flat design are extended in the plane of the stator plate also cover at least one of these zones and are electrically insulated at these points by means of an annular insulating layer disposed between these conductor connections and the stator plate, on the one hand, and the respective edge, on the other hand.

In a preferred embodiment of the invention, the motor coils are flat coils countersunk into the stator plate, flush with the stator plate on the front side thereof and projecting by 0.2 to 1.5 millimeters from the stator plate at the rear of the plate. The circuit elements and soldering points arranged directly opposite to the rotor on the backside of the stator plate do no extend axially substantially more than the flat coils. In this embodiment, the interspace between the motor coils projecting on the backside is also usable within the air gap additionally for circuit elements and/or soldering points. According to this further development of the invention, it is contemplated to accommodate at this location, for example, a Hall generator serving for the control of the commutator circuit. Such a Hall generator is sufficiently flat, so that it does not project substantially beyond the flat coil and can be most advantageously controlled magnetically if it is in direct opposition to the rotor.

According to another feature of the invention, punched-out adjustment components are provided in the edges of both housing shells which, when the motor is assembled, fit, in pairs, into respectively one alignment adjustment hole of the stator plate. This further development ensures that the housing shells, prefabricated by a mass production method, are always assembled exactly in a predetermined mutual position with the stator plate interposed therebetween. Accordingly, the position of the rotor with respect to the stator plate also corresponds exactly to the predetermined position, as is desirable for an optimum functioning of the motor.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE DRAWINGS

Figure 1:
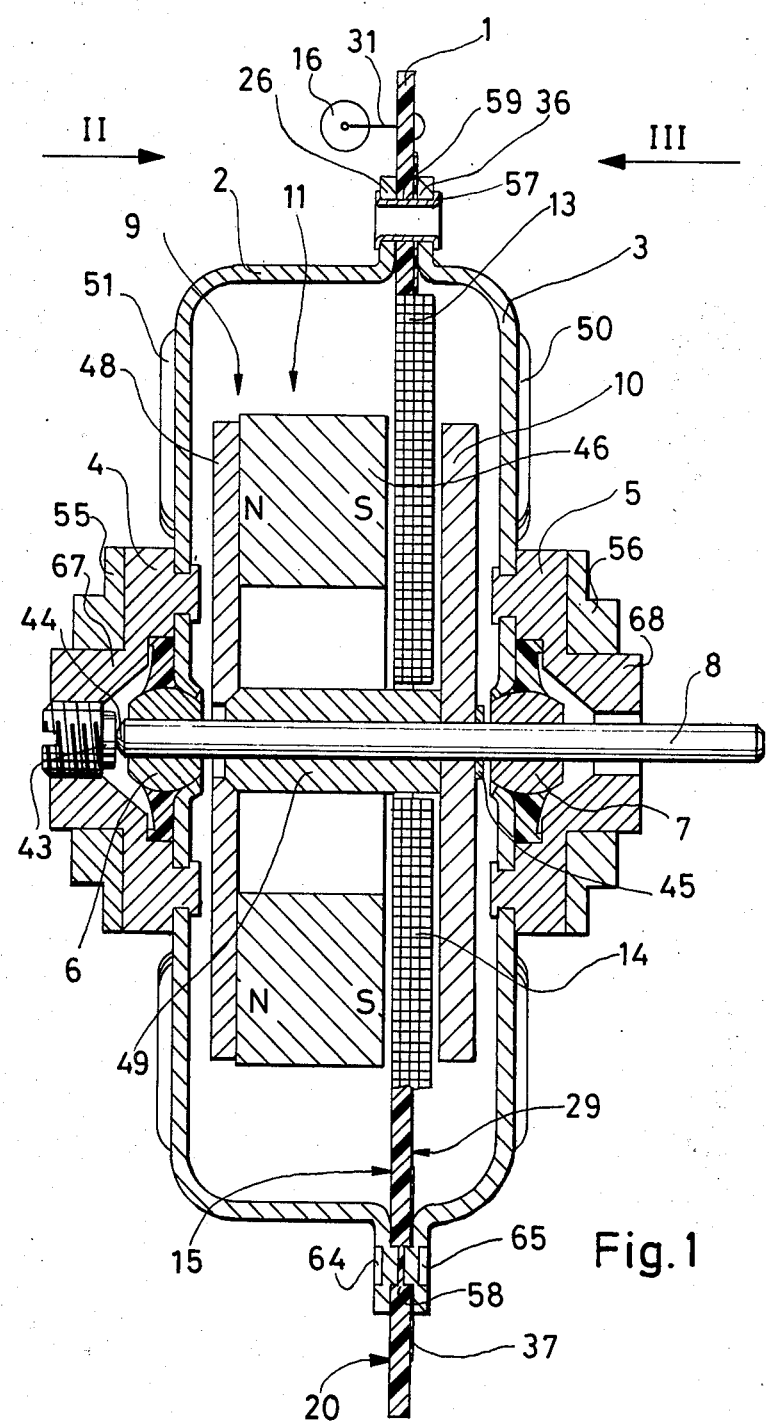
FIG. 1 shows a d-c motor according to the invention in a sectional view along line I—I in FIG. 2.

In the drawings, 1 denotes generally the stator plate, fashioned in the form of a flat, circular disk of an electric insulating material. The stator plate 1 is riveted between two housing shells 2 and 3, punched out of sheet iron. Bearing brackets 4 and 5 for respectively one cap-type bearing 6 and 7 are mounted in the housing shells 2 and 3. The rotor shaft 8 is supported in the two cap-type bearings 6 and 7, this shaft 8 being extended out of the housing shell 3. A rotor consisting of two disks 9 and 10 and generally denoted by 11 is placed on the rotor shaft 8. The rotor is of the permanent-magnet type, with a magnetic air gap between the two rotor disks 9 and 10, the stator plate 1 extending along this gap and having two flat coils 13, 14 countersunk in the stator plate in the zone of the air gap.

Figure 2:
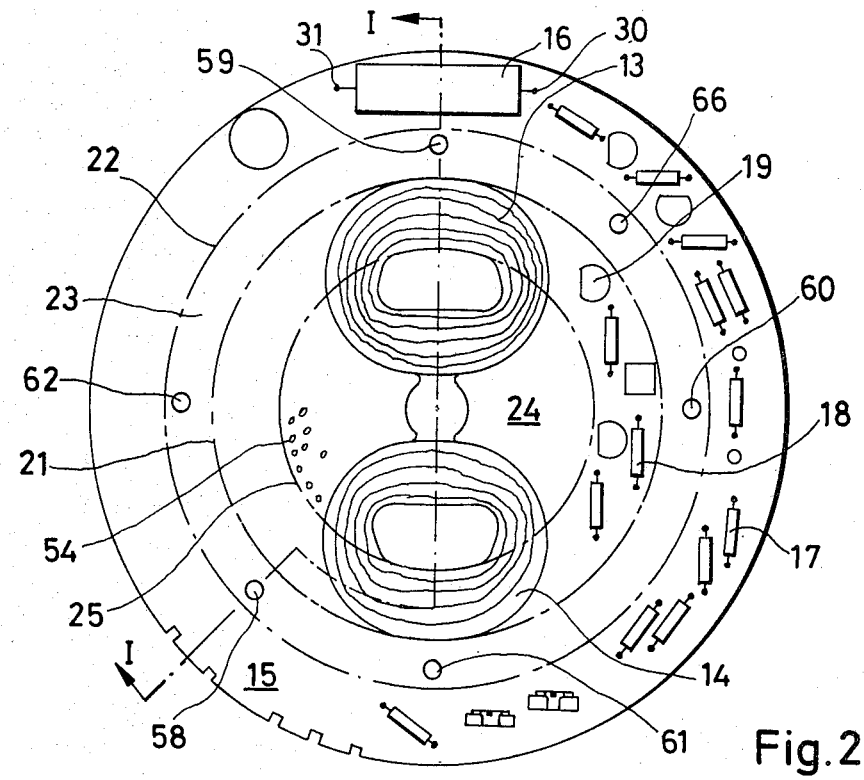
FIG. 2 is a front view of the stator plate of FIG. 1, as seen in the direction of arrow II in FIG. 1.

As can also be seen from FIG. 2, a plurality of electric circuit elements 16, 17, 18, 19, . . . is attached to the so-called front side 15 of the stator plate 1, shown on the lefthand side in FIG. 1. These circuit elements pertain to a speed controlled electronic commutator circuit with a temperature-compensating circuit as per se commonly known. The circuit elements of the temperature-compensating circuit are disposed on the stator plate within the housing formed by the housing shells 2 and 3, while the remaining circuit elements 16, 17 are located, in part, outside of this housing on the projecting rim 20 of the stator plate. The annular, concentric range 23 indicated by two dot-dash lines 21, 22 in FIG. 2, along which the outwardly angled edge 26 of the housing shell 2 contacts the front side of the stator plate 1 and is left free of circuit elements. The same holds true for a central, circular zone 24 surrounded by the dot-dash line 25 and being directly opposed to the rotor disk 9.

Figure 3:
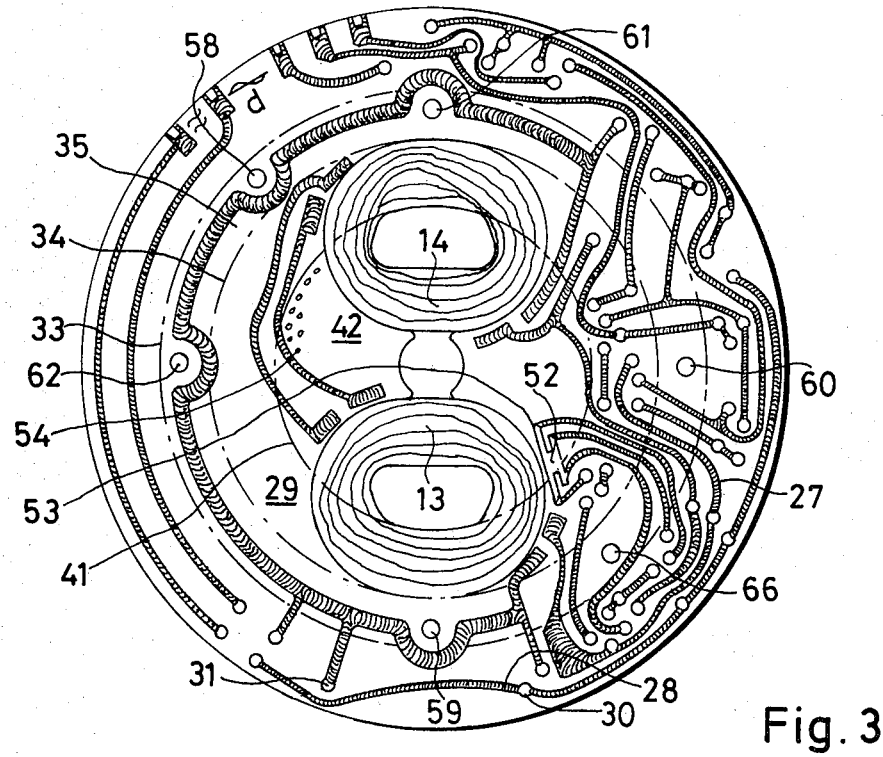
FIG. 3 is a rear view of the stator plate of FIG. 1, as seen in the direction of arrow III in FIG. 1.

The electric circuit connections 27, 28 are disposed, as can be seen from FIG. 3, on the backside 29 of the stator plate, namely preferably in the form of etched-out flat conductors. The circuit elements 16, 17, 18, 19, . . . arranged on the front side are passed, with their terminals 30, 31, through the stator plate and soldered on the backside 29 together with the connecting lines. The concentric, annular zone 35 defined by the dot-dash lines 33, 34 wherein the bent edge 36 of the housing shell 3 contacts the backside 29, does not have such soldering points. The connection lines extending at that point are electrically insulated with respect to the housing shell 3 by an annular insulating layer 37.

The two flat coils countersunk into the stator plate, which are likewise electrically connected to the connecting line system disposed on the backside 29, are flush with the stator plate 1 on the front side 15, but project by 0.2 – 1.5 millimeters from the stator plate on the backside of the latter. The soldering points 53 do not project any farther, either, insofar as they are located in the zone 42 directly opposing the rotor disk 10, defined by the dot-dash line 41 of FIG. 3.

Numeral 54 denotes iron pins for enhancing the torque performance and the startup, disposed in the zone 42 between the coils and extended through the stator plate 1. These iron pins 54 are flush with the front side 15 and extend 1.1 millimeters from the backside 29. Numeral 52 denotes a Hall generator of the commutator circuit, arranged in the zone 42 beside one of the flat coils on the backside 29; this Hall generator is flat and projects less than 1.5 millimeters past the backside 29.

The two rotor disks 9 and 10 extend, except for a minor tolerance gap, closely up to the flat coils 13, 14. Axial displacements of the rotor 11 are limited by an abutment disk 43 for the stub shaft 44 and an abutment disk 45 opposed to the cap-type bearing 7.

The rotor disk 9 — the so-called first rotor disk located in opposition to the front side 15 — is pot-shaped (tank-shaped) and has an annular permanent magnet 46 which is alternatingly axially magnetized across its circumference in correspondence with the number of poles provided, as is indicated in FIG. 1 by the labeling of the magnetic poles by north and south. The ring-shaped permanent magnet is backed by a magnetically conductive disk 48 connected with a tubular shaft 49; the other end of the latter carries the second rotor disk 10, which is fashioned to be magnetically conductive.

The two housing shells 2 and 3 are rigidified against resonance oscillations by radially extending ribs 50, 51 pressed into these shells.

The two bearing brackets 4, 5 each have a square end 67, 68. Square profiled rubber rings 55, 56 are placed on these two square ends, serving for the elastic suspension of the motor in a mounting, not shown.

Numerals 64 and 65 denote adjusting or aligning punched-out components, each housing shell 2, 3 having two such components in diametrical opposition. These punched-out adjustment means project on the side facing the stator plate 1 and fit, with minimum play, in adjustment holes 58, 66 of the stator plate, whereby the two housing shells 2 and 3 and the stator plate 1 are brought into exact mutual adjustment. Four rivets distributed along the periphery serve for the attachment of the housing shells, fitted together with exact adjustment, with the interposed stator plate 1; only the rivet 57 thereof is visible in FIG. 1. The riveting holes for these rivets provided in the stator plate 1 are denoted by 59 through 62 and can be seen from FIGS. 2 and 3. These riveting holes 59–62 are located, just as the adjustment holes 58 and 66, at those places of the zone 35 where no conductor connections are arranged.

The details of the electronic circuits have not been included herein in order not to obscure the present invention. However, a commonly assigned copending U.S. application Ser. No. 481,563, filed June 20, 1974, titled TORQUE EQUALIZED BRUSHLESS PERMANENT MAGNET ROTOR-MOTOR contains electronic circuit details for such a motor. The disclosure of said copending application is incorporated by reference herein to the extent necessary for a complete understanding of the present invention.

Figure 4:
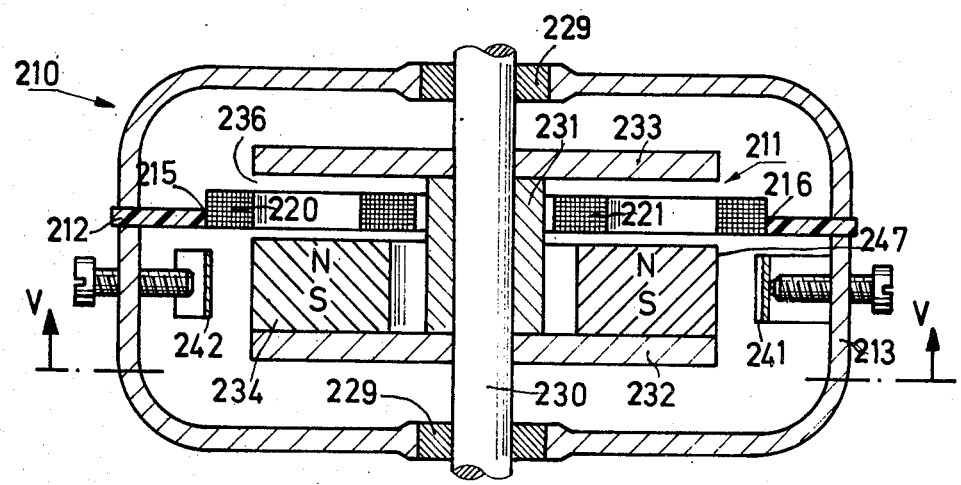
FIG. 4 is a longitudinal cross-sectional view through a further embodiment of an inventuous brushless d-c motor taken along line IV—IV of FIG. 5.
Figure 5:
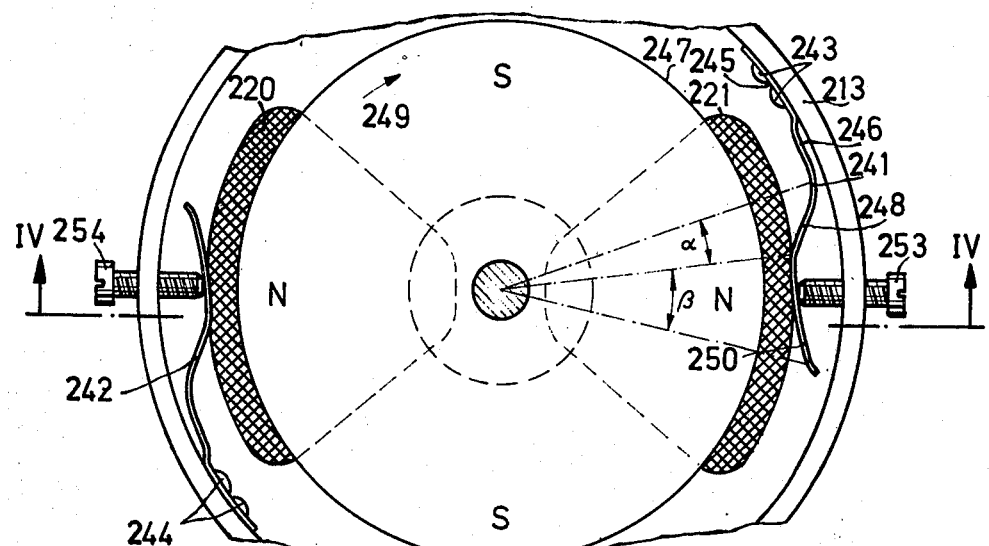
FIG. 5 is a sectional view along line V—V of FIG. 4.
Figure 6:
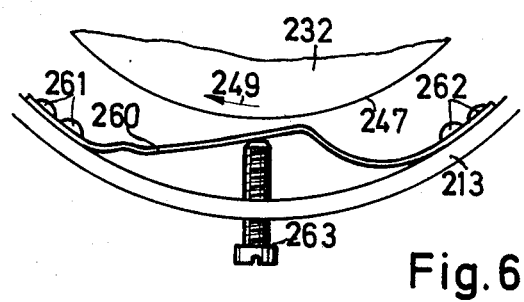
FIG. 6 is a fragmentary sectional view illustrating a modified embodiment of a soft iron strip, instead of pins 54 and the adjustment therefore, similar to one outer portion illustrated in FIG. 5.

Embodiment of FIGS. 4–6: A four-pole brushless motor 210, has a stator 211 secured on an insulating plate 212. The motor is enclosed by a ferromagnetic motor housing 213. Plate 212 carries a printed circuit (not shown) with the electronic switching elments of the motor 210. The plate 212 is formed with two openings 215, 216, in which core-less flat coils 220, 221, respectively are secured by adhesives. The shape of coils 220, 221 is seen in FIG. 19. The coils 220, 221 are mechanically offset by 180°, corresponding to 360° el. Shaft 230 penetrates centrally through plate 212, and is secured in bearings 22, 229' within housing 213. A spacer sleeve 231 accurately maintains two soft-iron disks 232, 233 spaced from each other, disk 232 having a four-pole axially magnetized ring magnet 234 adhered thereon. The pole gaps extend radially. These several poles of ring magnet 234 are indicated, as customary, by letters N and S. The flux distribution of the ring magnet 234, in developed form, is generally trapezoidal, and similar to curve B, FIG. 3. The soft-iron disk 233 rotates with the shaft and closes the magnetic circuit. Coils 220, 221 are located in the air gap 236.

Two soft-iron sheet metal elements 241, 242 are secured within housing 213 by means of rivets 243, 244 to the inner circumcerference thereof. The soft-iron elements 241, 242 are 360° electrically offset with respect to each other. They are identical, so that description of element 241 suffices and is equally applicable to element 242. Element 241 has a first portion 245 which closely fits the inner surface of the housing. It is then followed by a further section or zone 246 which is somewhat springy and which permits movement of the soft-iron element 241 with respect to the housing 213, and thus with respect to the outer circumference 247 of magnet 234. The soft-iron element 241 then is formed to have a zone 248 in which the effective distance between element 241 and the circumference 247 of the rotor 234 rapidly decreases. This rapidly decreasing zone extends over an annular range $\alpha$ — looked at in the direction or rotation 249. Subsequent to the rapidly decreasing range 248 of strip 41 follows the free end of the soft-iron element in zone 250, extending over an annular range $\beta$. The zone or portion 250 is so shaped that the radial disance — looked at in the direction of rotation — from the rotor increases gradually and slowly.

A screw 253 engages the free end of the zone 250 of the strip 241. Screw 250 acts as an adjustment element; by rotating the screw in a suitable tap or threaded hole in the housing 213, the distance between the strip 241 and the circumference 247 of the rotor can be increased or decreased. If the distance from the rotor is increased, the reluctance torque is decreased; upon decreasing the distance, that is, the gap between the soft-iron strip 241 and the circumference 247 of the rotor, the reluctance torque increases. An adjustment screw 254 similarly adjust the position of the strip 242. Preferably, adjustment of strips 241, 242 is done in the same direction for both strips, in order to prevent any unsymmetrical forces on the rotor magnet 234, that is, to prevent unilaterally acting radial unbalanced forces acting on the rotor.

The detailed construction shown in FIG. 6 is even better suited for some applications, since the soft-iron strip 260 is held at both ends by means of rivets 261, 262 on the housing 213. Adjustment screw 263, as above explained, provides for adjustment and deformation of the strip 260. The type of deformation of the strip is slightly different from that of the strips 241, 242, FIGS. 4 and 5. The arrangement in accordance with FIG. 6 has the advantage that the strip 260 cannot be subjected to undesired vibrations or oscillations at its free end.

Both of the foregoing examples (FIGS. 4 and 5 and FIG. 6) may provide a separate soft-iron strip for each pole of the rotor magnet. Smaller reluctance torques may, however, be generated with a lower number of strips; for example, as shown, two strips 241, 242 may be suitable for cooperation with a four-pole permanent magnet rotor. The arrangement of FIG. 6 may, of course, be applied at various circumferential positions of the housing 230, and, especially, duplicated symmetrically at the circumference of the housing 213, to provide for accurate adjustment of the reluctance torque, and to prevent radial unbalance forces acting on the rotor.

The last embodiment of FIGS. 4–6 shows a very advantageous structure, using the housing shell in a threefold manner: to shield thermally and magnetically as well as to bear the adjusting unit for and the soft-iron sheet itself to get an equalized torque.

While I have shown and described one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:
1. Collectorless d-c motor comprising:
   a rotor shaft,
   a permanent-magnet rotor including two rotor disks mounted for rotation with said rotor shaft,
   a stator plate extending between said rotor disks,
   flat motor coils attached to said stator plate,
   two housing shells in facing relationship to one another which are attached along their respective edges to said stator plate with edge portions of said stator plate extending outwardly of said housing shells, said housing shells together forming a housing space enclosing said rotor and coils,
   a plurality of circuit elements for said motor,
   and flat conductor connections associated with said circuit elements,
   some of said circuit elements being attached to said stator plate at positions inside said housing space and some of said circuit elements being attached to said stator plate at positions outside said housing space and spaced from said housing shells.

2. Motor according to claim 1, wherein said rotor shaft is rotatably supported by two bearings carried one each by said shells.

3. Motor according to claim 1, wherein said housing shells are made of metal and are formed with flat flanges at the edges thereof, said flat flanges extending in a radial direction with respect to the axis of rotation of said rotor shaft, said shells being connected to one another and said stator plate by mounting elements extending through said flanges and said stator plate.

4. Motor according to claim 3, wherein the flanges of one of said shells is aligned with and attached to the flange of the other shell by said mounting elements with said stator plate being clamped between said flanges in flat contact with both of said flanges, said mounting elements being located at positions spaced from said conductor connections and said circuit elements being located at positions spaced from the area of said stator plate in contact with said flanges.

5. Motor according to claim 4, wherein said conductor connections are of a flat design and extend in the plane of the stator plate, portions of said conductor connections extending between portions of said flanges and said stator plate being electrically insulated from said flanges by an insulating layer.

6. Motor according to claim 4, wherein said stator plate is a flat plate having a forward rearward facing surface, wherein electrical connection lines are etched out flat in the plane of the stator plate on the rearward surface thereof at positions both within and outside of the housing space, wherein said circuit elements are attached to the forward surface of said stator plate at positions both within and outside of the housing space, wherein portions of said stator plate in contact with said flanges are free of said connection lines and said circuit elements, and wherein connecting wire means are soldered together with respective connection lines on said rearward surface and extend through said stator plate to respective circuit elements.

7. Motor according to claim 6, wherein an annular concentric zone contacted by the edge of the rearward housing shell is free of soldering points and is electrically insulated by means of an annular insulating layer located between the conductor connections and the stator plate, on the one hand, and the respective edge of the housing shell, on the other hand.

8. Motor according to claim 4, wherein the motor coils are flat coils countersunk into the stator plate, which coils are flush with the stator plate on the front side thereof and project from the stator plate on the backside thereof by 0.2 – 1.5 millimeters; and wherein the circuit elements and soldering points disposed on the backside of the stator plate in direct opposition to the rotor do not project substantially farther than the flat coils.

9. Motor according to claim 4, wherein adjustment punched-out portions are provided in the edges of both housing shells which, when the motor is assembled, fit pairwise into respectively one alignment adjustment hole of the stator plate.

10. Motor according to claim 2, wherein said bearings are cap-type bearings and wherein bearing brackets for supporting said bearings are mounted in respective ones of said shells, and wherein polygon profiled elastic rings are placed on respective polygon shaped ends of said bearing brackets for the elastic suspension of said motor at a fixed structure.

11. Motor according to claim 4, wherein circuit elements for a motor temperature compensating control circuit are disposed on said stator plate completely inside said housing space, whereby said temperature compensating circuit is protected from cooling by ambient air outside said housing and especially from a sudden change of the ambient temperature.

12. Motor according to claim 3, wherein said metal consists of sheet iron to protect outside elements of magnetic sensitivity from magnetic stray flux of the motor.

* * * * *